(12) United States Patent
Flynn et al.

(10) Patent No.: US 8,555,704 B2
(45) Date of Patent: Oct. 15, 2013

(54) CALIBRATION SYSTEMS AND METHODS FOR TRACER GAS LEAK DETECTION

(75) Inventors: Kevin Flynn, Tewksbury, MA (US);
Charles Dodai, Framingham, MA (US);
J. Daniel Geist, Boxborough, MA (US)

(73) Assignee: Agilent Technologies, Inc., Santa Clara, CA (US)

( * ) Notice: Subject to any disclaimer, the term of this patent is extended or adjusted under 35 U.S.C. 154(b) by 897 days.

(21) Appl. No.: 12/254,279

(22) Filed: Oct. 20, 2008

(65) Prior Publication Data

US 2010/0095745 A1    Apr. 22, 2010

(51) Int. Cl.
*G01M 3/04*    (2006.01)
(52) U.S. Cl.
USPC .......................................................... 73/40.7
(58) Field of Classification Search
USPC .......................................................... 73/40.7
See application file for complete search history.

(56) References Cited

U.S. PATENT DOCUMENTS

| | | | | |
|---|---|---|---|---|
| 3,144,600 A | * | 8/1964 | Roberts | 324/468 |
| 4,329,883 A | * | 5/1982 | Barnes | 73/864.52 |
| 4,550,593 A | * | 11/1985 | Reich | 73/40.7 |
| 4,646,560 A | * | 3/1987 | Maresca et al. | 73/49.2 |
| 4,885,500 A | * | 12/1989 | Hansen et al. | 313/256 |
| 5,107,697 A | | 4/1992 | Tallon et al. | |
| 5,907,093 A | | 5/1999 | Lehmann | |
| 6,014,892 A | | 1/2000 | Baret et al. | |
| 6,263,724 B1 | | 7/2001 | Devance | |
| 6,354,141 B1 | * | 3/2002 | Pierrejean et al. | 73/40.7 |
| 7,427,751 B2 | | 9/2008 | Geist et al. | |

FOREIGN PATENT DOCUMENTS

| | | |
|---|---|---|
| CN | 1258351 A | 6/2000 |
| CN | 2828780 Y | 10/2006 |
| FR | 2653558 A1 | 4/1991 |
| JP | 2005315784 A | 11/2005 |

OTHER PUBLICATIONS

Chinese Office Action dated Dec. 26, 2012.

* cited by examiner

*Primary Examiner* — Peter J Macchiarolo
*Assistant Examiner* — Alex Devito

(57) ABSTRACT

Tracer gas leak detection is provided by a calibration system with a gas leak detector having a test port for receiving a sample containing a tracer gas and coupled to a vacuum pump; a calibrated leak for a calibration sample containing the tracer gas; a mass filter coupled to the test port for receiving the test sample in an operating mode, coupled to the calibrated leak through a calibrated leak valve for receiving the calibration sample in a calibration mode, having controllable transmission of the tracer gas and providing a filtered sample; detector detecting the tracer gas in the filtered sample; a programmable gain element providing a measured value of leak rate in response to the detector signal; and a controller configured, in response to a mode control signal, to operate the leak detector in the calibration mode over two or more working ranges using the calibrated leak.

18 Claims, 5 Drawing Sheets

| | | | | | |
|---|---|---|---|---|---|
| Displayed Ranges | -3 | -4 | -5 | -6 | -7 |
| Maximum Test Pressure/Crossover Pressure = 5 Torr | | | | | |
| Turbo Speed = 80K RPM | | | | | |
| Operating gain = 2, calibration gain = 1 | | | | | |
| Displayed Ranges | -4 | -5 | -6 | -7 | -8 |
| Maximum Test Pressure/Crossover Pressure = 5 Torr | | | | | |
| Turbo Speed = 60K RPM | | | | | |
| Operating gain = 2, calibration gain = 1 | | | | | |
| Displayed Ranges | -5 | -6 | -7 | -8 | -9 |
| Maximum Test Pressure/Crossover Pressure = 1 Torr | | | | | |
| Turbo Speed = 35K RPM | | | | | |
| Operating gain = 1, calibration gain = 1 | | | | | |
| Displayed Ranges | -6 | -7 | -8 | -9 | -10 |
| Maximum Test Pressure/Crossover Pressure = 1 Torr | | | | | |
| Turbo Speed = 33K RPM | | | | | |
| Operating gain = 8, calibration gain = 4 | | | | | |
| Log Analog output voltage | 9.99 to 8.0 | 7.99 to 6.0 | 5.99 to 4.0 | 3.99 to 2.0 | 1.99 to 0.0 |
| | | | | | MDL Range |

FIG. 4

CALIBRATION SYSTEMS AND METHODS FOR TRACER GAS LEAK DETECTION

FIELD OF THE INVENTION

This invention relates to detection of leaks in sealed parts using a tracer gas and, more particularly, to systems and methods for calibration of leak detectors. In some embodiments, two or more leak detection ranges are calibrated using a single calibrated leak.

BACKGROUND OF THE INVENTION

Leak detection using helium or hydrogen as tracer gas is well-known. Helium passes through the smallest of leaks in a sealed test piece. After passing through a leak in the test piece, the helium is drawn into a leak detection instrument and is measured. The quantity of helium measured corresponds to the leak rate. In one approach, the interior of a test piece is coupled to a test port of the leak detector. Helium is sprayed onto the exterior of the test piece, is drawn inside through a leak and is measured by the leak detector. In another approach, the test piece is pressurized with helium. A sniffer probe connected to the test port of the leak detector is moved around the exterior of the test piece. Helium passes through a leak in the test piece, is drawn into the probe and is measured by the leak detector.

To meet the demanding requirements of industry, a tracer gas leak detector needs to be capable of precise calibration and to have a low cost of ownership. The precise calibration of a leak detector may be achieved by adjusting a system gain value until the leak detector indicates the predetermined value of a calibrated leak standard, also known as a calibrated leak, having a known leak rate. In various applications, leak rates may be measured over several decades, such as $10^{-3}$ std-cc/sec to $10^{-9}$ std-cc/sec, also referred to as E-03 std-cc/sec to E-09 std-cc/sec or simply E-03 to E-09.

A prior art tracer gas leak detector is illustrated schematically in FIG. 1. A test port 30 is coupled through contraflow valves 32 and 34 to a forepump 36. The leak detector also includes a turbopump (turbomolecular vacuum pump) 40 having a fixed rotation speed. The test port 30 is coupled through midstage valves 42 and 44 to a midstage port 46 located on turbopump 40 between a foreline 48 and an inlet 50. A foreline valve 52 couples forepump 36 to the foreline 48 of turbopump 40. The inlet 50 of turbopump 40 is coupled to the inlet of a mass spectrometer 60. The leak detector further includes a test port thermocouple 62 and a vent valve 64, both coupled to test port 30, a calibrated leak 66 coupled through a calibrated leak valve 68 to midstage port 46 of turbopump 40 and a ballast valve 70 coupled to forepump 36.

In operation, forepump 36 initially evacuates test port 30 and the test piece (or sniffer probe) by closing foreline valve 52 and vent valve 64 and opening contraflow valves 32 and 34. When the pressure at the test port 30 reaches a level compatible with the foreline pressure of turbopump 40, foreline valve 52 is opened, connecting test port 30 to the foreline 48 of turbopump 40. The helium tracer gas is drawn through test port 30 and diffuses in reverse direction through turbopump 40 to mass spectrometer 60. Since turbopump 40 has a much lower reverse diffusion rate for heavier gases in the sample, it blocks these gases from mass spectrometer 60, thereby efficiently separating the tracer gas, which diffuses through turbopump 40 to mass spectrometer 60 and is measured.

In the prior art leak detector of FIG. 1, calibration is performed by using a different calibrated leak 66 for each decade of the measurement range. That is, a calibrated leak having an appropriate leak rate is selected according to the decade of the measurement range being calibrated. The selected calibrated leak is attached to the system and the signal from spectrometer 60 is measured. A difference between the measured value and the known value of the calibrated leak provides a calibration value for the selected decade of the measurement range.

A different calibrated leak is used to calibrate each decade of the measurement range in the leak detector of FIG. 1. That is, if the user will be leak testing a part in the E-05 leak rate range, the test system is calibrated using an E-05 range calibrated leak. If the user will be leak testing in the E-06 leak rate range, an E-06 range calibrated leak is used. In a production factory with many different parts being leak tested, different leak test systems may be simultaneously working in different leak rate ranges.

As stated above, the calibration process for a leak detector requires setting of a system gain value to compensate the measured leak rate to equal a known leak standard. The leak measurement capability can be scaled linearly over some range above or below the specific calibration point. However, in cases where accuracy is important, a calibrated leak standard for the specific decade of measurement is used. Calibrated leak standards cost several hundred dollars each and require periodic calibration. The cost to procure and recalibrate the leak standards and to maintain calibration tracking records is a significant cost to an industrial user.

Accordingly, there is a need for improved calibration methods and systems for tracer gas leak detection.

SUMMARY OF THE INVENTION

According to a first aspect of the invention, a tracer gas leak detector comprises a test port to receive a test sample containing a tracer gas, a vacuum pump coupled to the test port, a calibrated leak to provide a calibration sample containing the tracer gas, a mass filter coupled to the test port to receive the test sample in an operating mode and coupled to the calibrated leak through a calibrated leak valve to receive the calibration sample in a calibration mode, the mass filter having controllable transmission of the tracer gas and providing a filtered sample, a detector to detect the tracer gas in the filtered sample and to provide a detector signal, a programmable gain element to provide a measured value of leak rate in response to the detector signal, and a controller configured, in response to a mode control signal, to operate the leak detector in the calibration mode, wherein the controller is configured to calibrate the leak detector over two or more working ranges using the calibrated leak.

According to a second aspect of the invention, a method for calibration of a tracer gas leak detector comprises supplying a calibrated sample from a calibrated leak to a mass filter through a calibrated leak valve, the mass filter providing a filtered sample in response to the calibration sample, detecting the filtered sample and providing a detector signal, adjusting the detector signal with a programmable gain element to provide a measured value of leak rate, determining a first calibration value for a first working range by calibrating a first measured value with respect to the calibrated leak, and determining a second calibration value for the second working range by calibrating a second measured value with respect to the calibrated leak.

BRIEF DESCRIPTION OF THE DRAWINGS

For a better understanding of the present invention, reference is made to the accompanying drawings, which are incorporated herein by reference and in which:

FIG. 4 is a table that illustrates calibration and operating parameters for different leak detection working ranges.

DETAILED DESCRIPTION OF THE INVENTION

Figure 1:
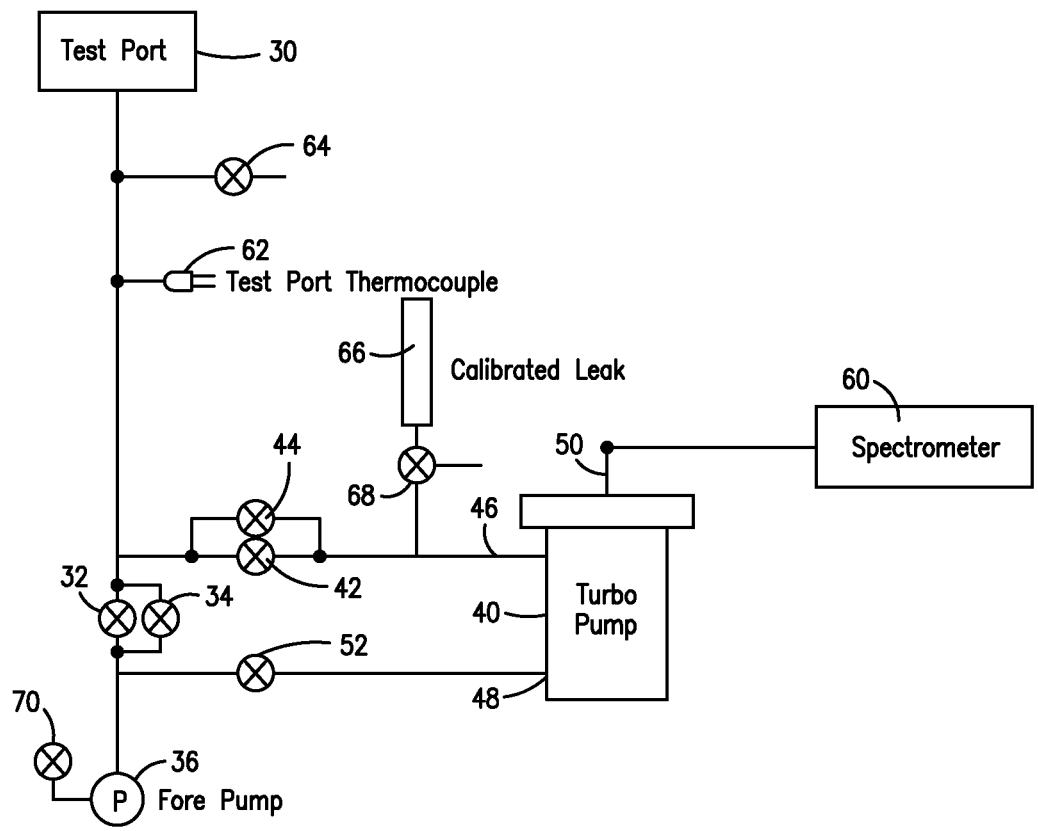
FIG. 1 is a schematic block diagram of a prior art tracer gas leak detector.
Figure 2:
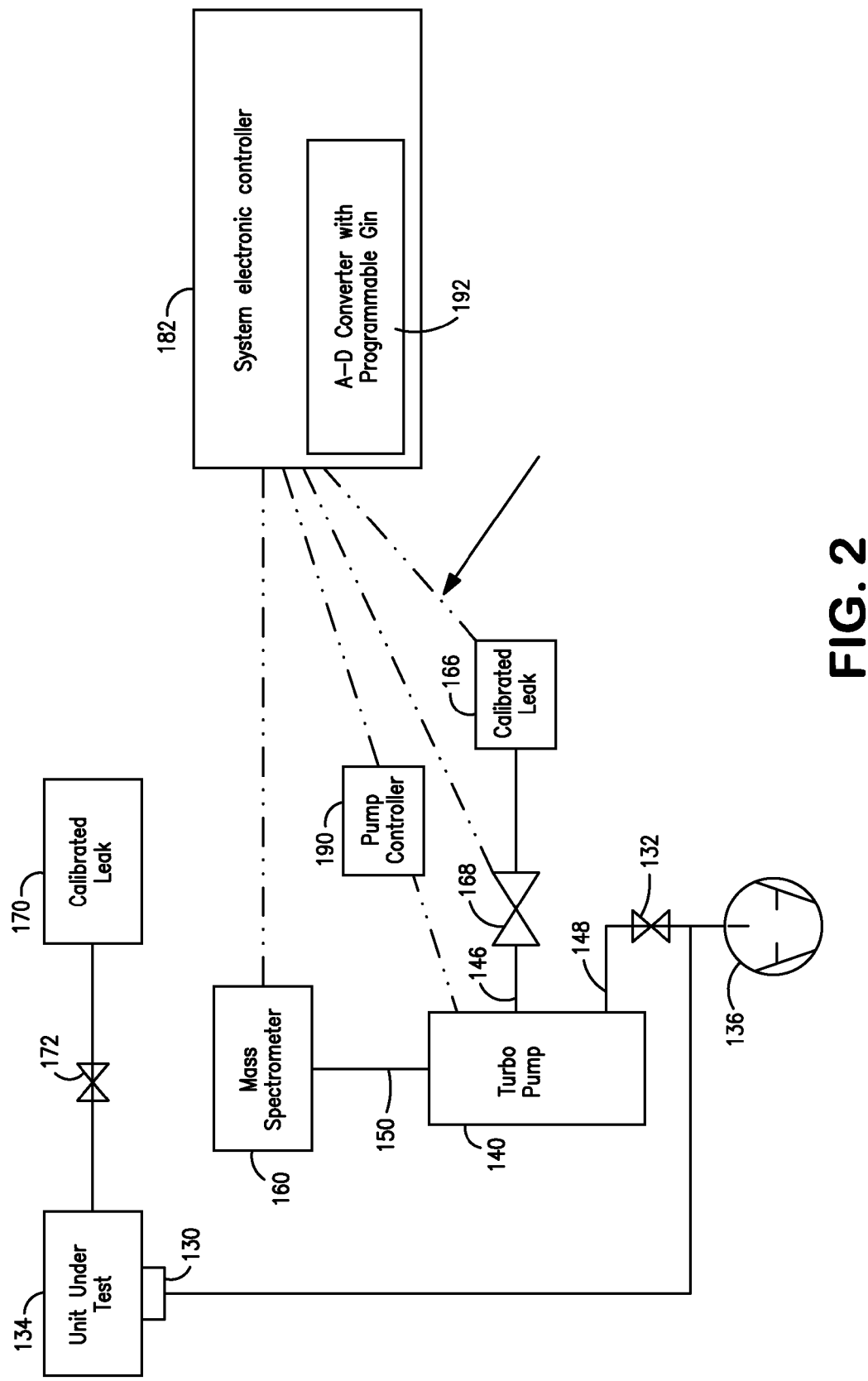
FIG. 2 is a schematic block diagram of a tracer gas leak detector in accordance with embodiments of the invention.

A tracer gas leak detector in accordance with embodiments of the invention is illustrated schematically in FIG. 2. A test port 130 is coupled through a test port valve 132 to a foreline 148 of a turbopump (turbomolecular vacuum pump) 140, which functions as a controllable mass filter. Test port 130 is also coupled to a forepump 136. A unit under test 134 or a sniffer probe (not shown) may be connected to test port 130. An inlet 150 of turbopump 140 is coupled to the inlet of a mass spectrometer 160, which functions as a tracer gas detector. A detector signal 180 is supplied by mass spectrometer 160 to a system controller 182. A calibrated leak 166 is coupled through a calibrated leak valve 168 to an intermediate port 146 of turbopump 140. A variable speed turbopump controller 190 with feedback control controls the speed of turbopump 140 as described below. System controller 182 includes a programmable gain element 192, which receives detector signal 180 and applies a programmable gain as described below. System controller 182 controls elements of the leak detector, including the mass spectrometer 160, the turbopump 140, the calibrated leak valve 168, the turbopump controller 190 and the calibrated leak 166, during operating and calibration modes as described below.

In other embodiments, an optional external calibrated leak 170 may be connected through a valve 172 to test port 130. Valve 172 may be connected directly to test port 130 or may be connected to unit under test 134. The external calibrated leak 170 provides an alternate leak standard to be used during calibration.

Figure 3:
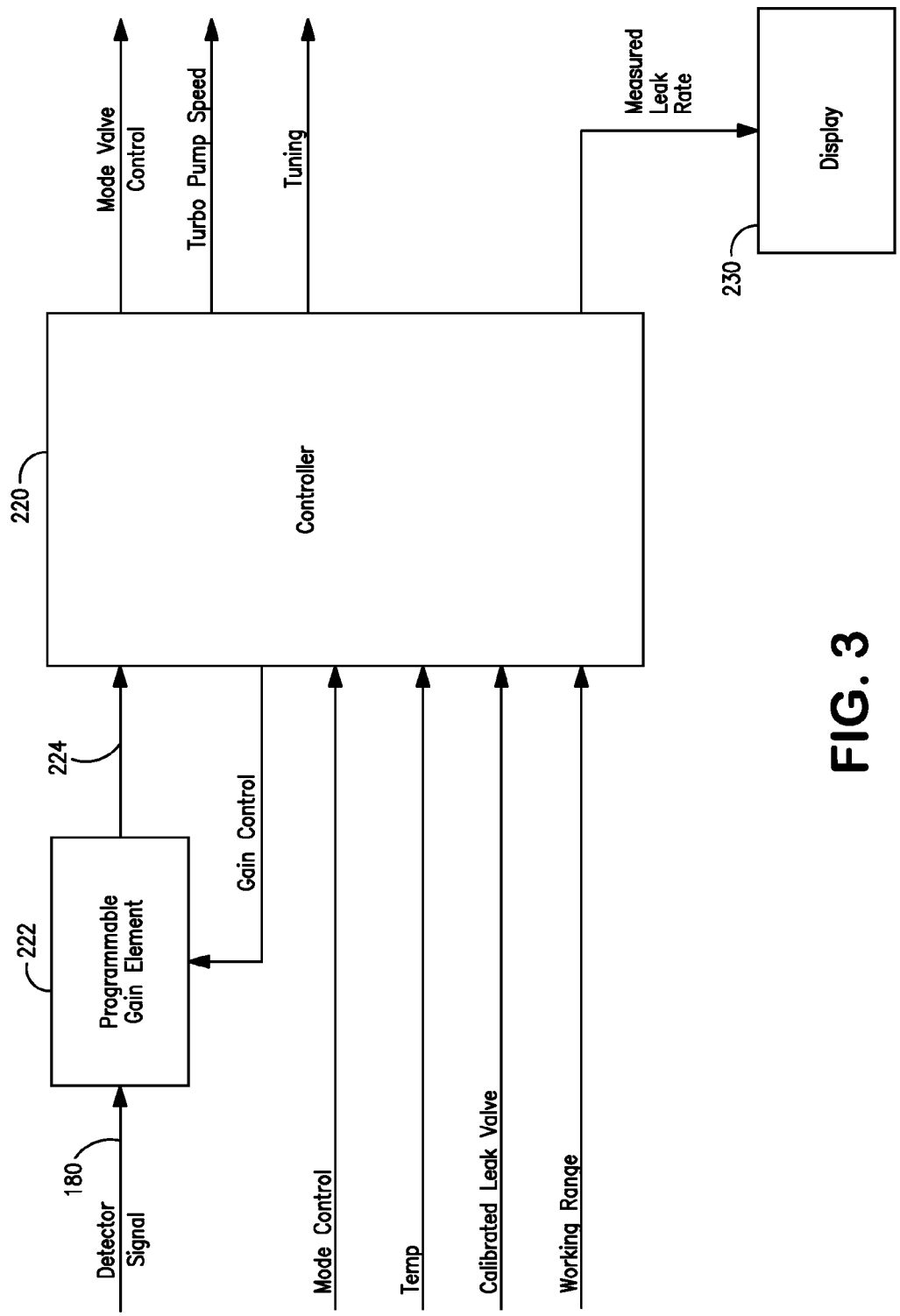
FIG. 3 is a block diagram of the system controller shown in FIG. 2, in accordance with embodiments of the invention.

A simplified block diagram of system controller 182 in accordance with embodiments of the invention is shown in FIG. 3. System controller 182 includes a controller 220 which controls the leak detector during both operating and calibration modes as described below. Controller 220 may be a programmable digital processor, such as a microprocessor or a process controller, or may be a hardwired controller, such as an ASIC or a hardwired circuit. If necessary, analog inputs to controller 220 may be converted to digital input signals by one or more analog-to-digital converters, and digital outputs of controller 220 may be converted to analog signals by one or more digital-to-analog converters.

A programmable gain element 222 receives the detector signal 180 from mass spectrometer 160 and supplies a gain adjusted digital value to controller 220. Controller 220 supplies a gain control signal to programmable gain element 222. The programmable gain element 222 may be an analog-to-digital converter (ADC), such as a sigma delta converter, a dual slope successive approximation converter or a flash converter, any of which have the capability to change the system gain within milliseconds upon command from controller 220 and with a high level of precision to achieve precise leak detector calibration over several decades of working range using only a single calibrated leak.

Controller 220 receives a mode control signal which selects an operating mode or a calibration mode of the leak detector. The operating mode may be user selectable. Controller 220 also receives a calibrated leak value, which represents the known leak rate of calibrated leak 166 or calibrated leak 170, and a temperature value which represents the current temperature of the calibrated leak. It will be understood that the leak rate of calibrated leak 166 may vary as a function of temperature. Controller 220 also receives a working range selected by the user. As discussed below, the leak detector may operate over several working ranges of leak rates, all of which may be calibrated with a single calibrated leak.

Controller 220 outputs a calibrated leak valve control signal to calibrated leak valve 168 to control operation in the calibration mode. A turbopump speed control signal is supplied to turbopump controller 190 to control the rotation speed of turbopump 140 in the operating mode and in the calibration mode. A mass spectrometer tuning signal is supplied to mass spectrometer 160 to control tuning of the mass spectrometer for maximum detector signal. A measured leak rate, which has been calibrated as described below, is output to a display 230.

Referring again to FIG. 2, turbopump 140 is one embodiment of a mass filter which transmits the tracer gas, such as helium, to mass spectrometer 160 and substantially blocks heavier gases in the sample. The tracer gas transmission of the turbopump 140 can be varied by adjusting its rotation speed. A higher rotation speed transmits less of the tracer gas to mass spectrometer 160 and, conversely, a lower rotation speed transmits more of the tracer gas to mass spectrometer 160. The turbopump 140 is operated in the so-called "contraflow" configuration, wherein the light tracer gas passes in reverse direction from the foreline 148 to the inlet 150 of turbopump 140, and heavier gases are substantially blocked.

The turbopump controller 190 has a software controlled feedback loop to measure and report the actual RPM and to maintain the selected setting very accurately so that helium flow through the turbopump is constant at the selected rotation speed. During normal leak testing operation, the turbopump RPM is automatically set by controller 220 to a predefined rotation speed for a given working range. The speed selected provides the appropriate degree of mass filtering of the helium in order to operate in the desired working range.

Other embodiments of the mass filter may be utilized within the scope of the invention. For example, other types of vacuum pumps may be utilized in the contraflow configuration. Suitable vacuum pumps are characterized by a low compression ratio for light gases, such as the tracer gas, and a high compression ratio for heavy gases. Examples include molecular drag vacuum pumps, hybrid vacuum pumps, which utilize a combination of turbomolecular stages and molecular drag stages, and diffusion pumps. In each case, transmission of the tracer gas by the mass filter can be varied by adjusting a parameter of the mass filter, such as rotation speed, for different working ranges of the leak detector.

In further embodiments, the mass filter may be a tracer gas permeable member, such as a permeable membrane. The permeable member may be permeable to helium, and the helium permeability of the permeable member may be controllable. In some embodiments, the permeable member comprises a quartz member. The mass filter may further include a heating element in thermal contact with the permeable member, and the controller may be configured to control the heating element. The permeable member substantially passes, or permeates, the tracer gas while substantially blocking other gases, liquids and particles. As indicated, quartz is an example of a material that is permeable to helium. The helium permeability of quartz varies with temperature. At elevated temperatures in the range of 300° C. to 900° C., quartz has a relatively high helium permeability. At room temperature, quartz has a relatively low helium permeability. The temperature of the permeable member can be adjusted to control the permeability, or transmission, of helium in different working ranges of the leak detector.

The mass filter is used to permit tracer gas flow into the detection system, while substantially blocking the flow of other gases, thereby creating a high concentration of the tracer gas at the detector for signal measurement. The intermediate port 146 provides a factor of approximately ten times greater flow of tracer gas to the detector as compared with the foreline 148. The mass filter is controlled by an electronic feedback loop that controls transmission of the tracer gas. In the case of a rotating vacuum pump, the rotation speed may be controlled, whereas temperature may be controlled in the case of a permeable membrane.

The mass spectrometer 160 is a commonly used detector in leak detection systems. However, other detectors may be utilized, such as cold cathode sensors, ion pumps, hydrogen sensors and other detectors which can detect the tracer gas concentration in a sample.

A single, temperature compensated calibrated leak 166 is installed in the leak detector with calibrated leak valve 168 to activate or deactivate the flow of tracer gas into the vacuum system and the detector. In the embodiment of FIG. 2, the calibrated leak 166 is installed at an intermediate port of the turbopump 140. The intermediate port 146 is designed so that a factor of approximately 10 in signal strength is realized between the foreline 148 and the intermediate port 146. During calibration of the leak detector using the known calibrated leak, a precise "system gain" value is determined to provide precise absolute leak rate accuracy.

In the embodiment described herein, the calibrated leak 166 is an E-07 helium leak, which is convenient for low-cost manufacture and is at about the middle of the industrial working range. The calibrated leak is temperature compensated by the controller 220 to adjust for the difference between ambient temperature and the temperature at the time the value of the calibrated leak was measured. Other calibrated leak values can be used to meet specific application requirements.

The programmable gain element 222 is used to control the detector signal 180 during both operating and calibration modes. The programmable gain element may be an analog-to-digital converter, such as a sigma delta converter, a dual slope, successive approximation converter or a flash converter, any of which have the capability to change the system gain within milliseconds upon command from the controller 220 and with a high level of precision to achieve precise leak detector calibration over several decades of working range using only a single calibrated leak.

A table that illustrates several working ranges of the leak detector and corresponding parameters for the operating mode and the calibration mode is shown in FIG. 4. In FIG. 4, each working range covers four leak rate decades, the right column of each working range not being utilized for measurement. In the embodiment of FIG. 4, the user may select a first working range covering leak rates from E-03 to E-06, a second working range covering leak rates from E-04 to E-07, a third working range covering leak rates from E-05 to E-08 and a fourth working range covering leak rates from E-06 to E-09. The turbopump rotation speed for each working range is shown in FIG. 4. In addition, each working range is associated with an operating gain and a calibration gain of programmable gain element 222. The rotation speed of turbopump 140 and the gain of programmable gain element 222 are selected such that the digital value 224 produced by the calibrated leak 166 is within the dynamic range of the processing circuitry in controller 220. As indicated above, reducing the rotation speed of turbopump 140 increases the transmission of tracer gas through the turbopump to mass spectrometer 160. In some cases, the calibration gain is lower than the operating gain. This may result, at least in part, from the fact that calibrated leak 166 is connected to intermediate port 146 of turbopump 140, resulting in greater transmission of the tracer gas from calibrated leak 166 to mass spectrometer 160 as compared with transmission of tracer gas from foreline 148 to mass spectrometer 160.

Figure 5:
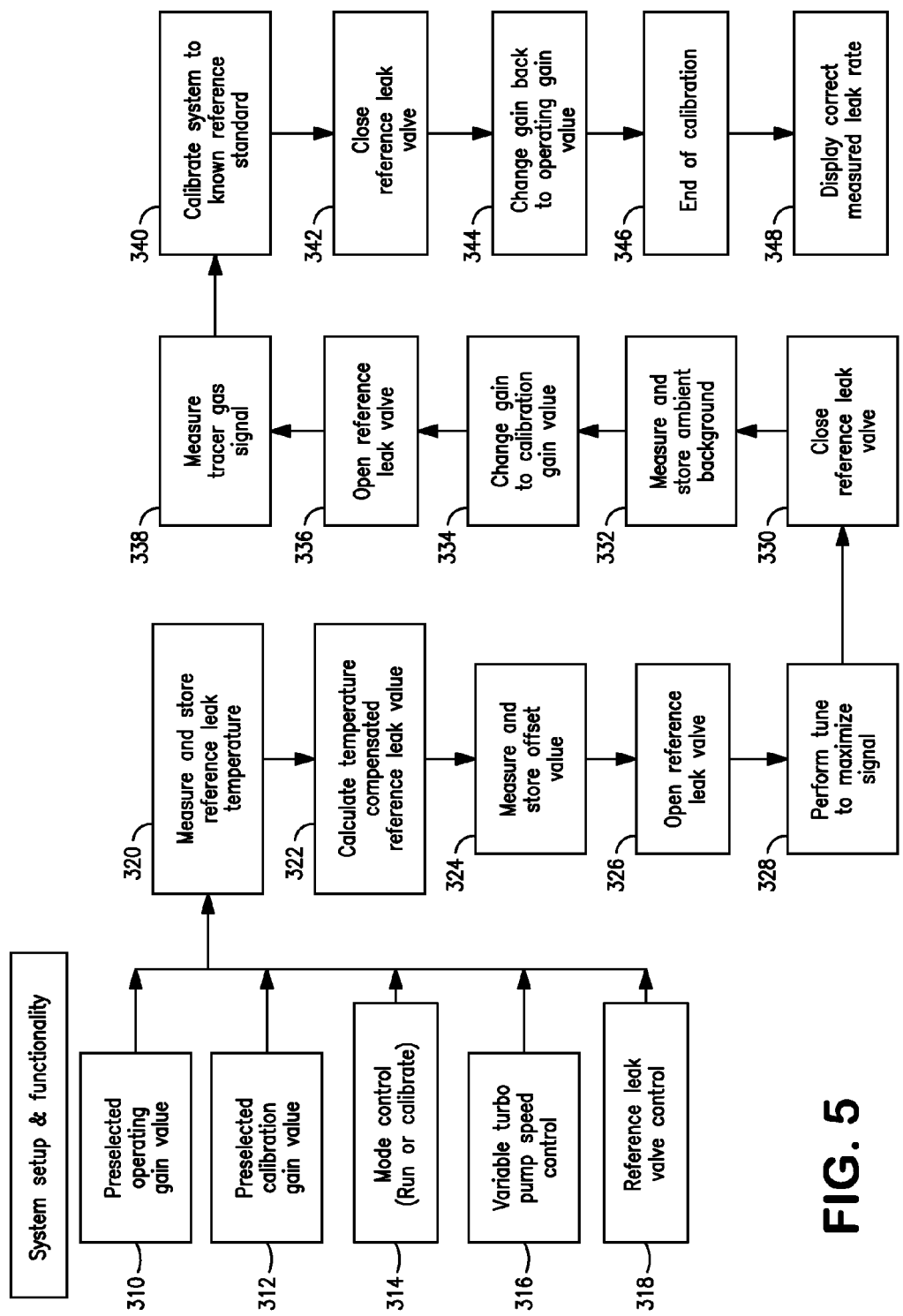
FIG. 5 is a flow chart that illustrates operation of the leak detector shown in FIG. 2, in accordance with embodiments of the invention.

A flowchart that illustrates operation of the leak detector in the calibration mode in accordance with embodiments of the invention is shown in FIG. 5. The leak detector is set up to perform a desired function, such as normal operation or calibration. As indicated by block 310, software in controller 220 maintains preset operating gain values which are used during normal leak test operations. The value of the operating gain varies as shown in FIG. 4, according to the working range selected by the user. As indicated by block 312, the software in controller 220 maintains preset calibration gain values and adjusts the calibration gain value according to the working range selected by the user. The software automatically changes the gain value from the operating gain to the calibration gain, depending on the selected mode of operation and the selected working range. As indicated by block 316, the controller 220 controls the tracer gas transmission of the mass filter (the quantity of tracer gas that passes through the mass filter to the detector) required for leak test operation in each of the working ranges. The variable mass filtration scales a wide range of possible leak rates to the working ranges of the leak detector system. The tracer gas transmission of the mass filter can be accomplished by varying the rotation speed of a turbomolecular pump or the temperature of a permeable membrane, for example. As indicated by block 314, the operating mode or the calibration mode is selected in response to user input. As indicated in block 318, the calibrated leak valve 168 is controlled according to the selected mode and may be opened or closed during various steps of the calibration process. These setup operations enable the leak detector to perform calibration in a selected working range.

In act 320, the temperature of calibrated leak 166 is measured and stored, and in act 322, a temperature-compensated value of the calibrated leak is calculated. The controller 220 stores the variation of leak rate as a function of temperature of the calibrated leak and automatically compensates the calibrated leak value for ambient temperature at the time of calibration. In step 324, the controller measures and stores an offset value based on an electronics noise level. In act 326, the calibrated leak valve 168 is opened and the mass spectrometer 160 is tuned in act 328 to maximize the detector signal. Tuning may be accomplished by varying the magnetic field applied to tracer gas ions or adjusting the ion voltage within the mass spectrometer to maximize the number of tracer gas ions passing through a slit and being detected.

In act 330, calibrated leak valve 168 is closed, and the ambient background signal is measured and stored in act 332. The tracer gas background signal can be used to effectively compensate for background signal during normal operations. In act 334, the gain of programmable gain element 222 is changed to the calibration gain value for the selected working range and the calibrated leak valve 168 is opened in act 336. The tracer gas signal produced by the calibrated leak 166 is measured in act 338. In act 340, the measured tracer gas signal is used to calibrate the leak detector system. In particular, the measured value of the calibrated leak and the known value of the calibrated leak are used to calibrate the system by determining a "system gain", defined as the temperature compensated known leak rate divided by the measured leak rate, corrected for background signal and electronic offset. During measurement of a test piece in the operating mode in act 348, the measured value is multiplied by the calculated system gain to display an actual leak rate.

In act 342, the calibrated leak valve 168 is closed and in act 344, the gain of programmable gain element 222 is changed to the operating gain value. The controller automatically sets default operating and calibration gain values based on user selection of a leak rate working range. Once the user selects a working range, the controller adjusts all of the operating parameters required to function in that range. When the user selects a new working range, the controller automatically readjusts the operating parameters for the new working range.

The change to the operating gain value represents the end of the calibration procedure in act 346. In act 348, a correct and calibrated measured leak rate is displayed. The controller uses the detector signal and the parameters described above to compute a measured leak rate scaled to the appropriate working range.

The calibration procedure has been shown and described for a single working range. The calibration procedure can be repeated for each working range to be utilized, with corresponding settings of turbopump rotation speed and calibration gain, as shown in FIG. 4. The calibration procedure can be performed at any time, such as initially when the leak detector is turned on, at selected intervals, or when changing to a new working range.

It will be understood that different working ranges, different calibrated leak values and different leak detector parameters may be used within the scope of the invention. In addition, the calibration procedure may be performed with external calibrated leak 170, with appropriate changes to the turbopump rotation speeds and the calibration gain values to account for the different location of calibrated leak 170.

At startup, the software in controller 220 automatically loads initial parameters for operation. The user selects the working range via a graphic display screen or an electronic signal input from a host computer. The software automatically sets all of the operating parameters described above to configure the system. The gain of the programmable gain element is set to the operating gain value and the turbopump rotation speed is set for the selected leak test operation as shown in FIG. 4. The operating and calibration gain values for one embodiment are shown with the turbopump rotation speeds in the table of FIG. 4.

When a calibration is selected, the software automatically controls the hardware and the parameters discussed above to perform the user-requested calibration depending on which working range was selected. The hardware gain of the programmable gain element is automatically changed from the operating gain value to the calibration gain value. The gain change is accomplished in milliseconds and with high accuracy, so that the E-07 range leak can be read in any of the four possible leak rate working ranges. Since the calibrated leak is connected to the intermediate port near the top of the turbopump with lower compression ratio compared to the foreline, the calibrated leak signal is ten times greater than the normal operating signal. This effectively shifts the calibrated leak signal by one decade in the table of FIG. 4. The combination of ten times signal in calibration mode and the precise automatic control of gain via software permits one calibrated leak to be used for accurate calibration in a wide range of leak rate decades. The automatic change of gain value permits calibration with the E-07 calibrated leak for precise absolute calibration within the four working ranges. Thus, the E-07 calibrated leak provides precise calibration in several working ranges as selected by the user.

For example, if a calibration is selected while the system is operating in the E-04 to E-07 working range, the turbopump rotation speed is set to 60,000 RPM, the gain value is automatically switched to a calibration gain of one, a new offset value is computed, the detector is automatically tuned and the appropriate system gain is calculated to achieve precise, absolute calibration in the desired range. When the calibration is complete, the software automatically switches the gain value back to the operating gain value of two. The change of gain from the operating gain to the calibration gain and back is changed transparently to the user and is done in milliseconds.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A tracer gas leak detector comprising:
   a test port configured to receive a test sample containing a tracer gas;
   a calibrated leak configured to provide a calibration sample containing the tracer gas;
   a mass filter coupled to the test port to receive the test sample in an operating mode, and coupled to the calibrated leak through a calibrated leak valve to receive the calibration sample in a calibration mode, the mass filter being controllable to vary transmission of the tracer gas through the mass filter and providing a filtered sample;
   a detector configured to detect the tracer gas in the filtered sample and to provide a detector signal;
   a programmable gain element configured to provide a measured value of leak rate in response to the detector signal; and
   a controller configured to operate the leak detector in the calibration mode in response to a mode control signal, and to calibrate the leak detector over two or more working ranges using the same calibrated leak,
   wherein, for each working range, the controller is configured to select the transmission of the tracer gas through the mass filter and the gain of the programmable gain element such that the measured value of the leak rate provided by the calibrated leak is within a same dynamic range of the controller.

2. The tracer gas leak detector as defined in claim 1, wherein the mass filter comprises a turbomolecular pump having controllable speed, the turbomolecular pump having an inlet coupled to the detector and a foreline coupled to the test port.

3. The tracer gas leak detector as defined in claim 2, further comprising:
   a pump controller coupled between the controller and the turbomolecular pump, the pump controller providing feedback control of a speed of the turbomolecular pump in order to vary the transmission of the tracer gas under control of the controller.

4. The tracer gas leak detector as defined in claim 2, wherein the calibrated leak is coupled through the calibrated leak valve to an intermediate port of the turbomolecular pump.

5. The tracer gas leak detector as defined in claim 4, wherein transmission of tracer gas from the calibrated leak to the detector through the intermediate port is greater than transmission of tracer gas from the test port to the detector through the foreline of the turbomolecular pump.

6. The tracer gas leak detector as defined in claim 1, wherein the programmable gain element comprises an analog-to-digital converter with programmable gain.

7. The tracer gas leak detector as defined in claim 2, wherein the detector comprises a mass spectrometer.

8. The tracer gas leak detector as defined in claim 1, wherein the mass filter comprises a vacuum pump that is characterized by a relatively low compression ratio for light gases and a relatively high compression ratio for heavy gases.

9. A tracer gas leak detector comprising:
a test port to receive a test sample containing a tracer gas;
a vacuum pump coupled to the test port;
a calibrated leak to provide a calibration sample containing the tracer gas;
a mass filter coupled to the test port to receive the test sample in an operating mode and coupled to the calibrated leak through a calibrated leak valve to receive the calibration sample in a calibration mode, the mass filter comprising a tracer gas permeable member having controllable permeability for controlling transmission of the tracer gas correspondg and providing a filtered sample;
a detector to detect the tracer gas in the filtered sample and to provide a detector signal;
a programmable gain element to provide a measured value of leak rate in response to the detector signal; and
a controller configured, in response to a mode control signal, to operate the leak detector in the calibration mode, wherein the controller is configured to calibrate the leak detector over two or more working ranges using the calibrated leak.

10. The tracer gas leak detector as defined in claim 1, wherein calibration is performed automatically in response to the mode control signal, by control of the calibrated leak valve, the transmission of the mass filter and the gain of the programmable gain element.

11. A method for calibration of a tracer gas leak detector, comprising:

supplying a calibrated sample from a calibrated leak to a mass filter through a calibrated leak valve, the mass filter providing variable transmission of a filtered sample in response to the calibration sample;
detecting the filtered sample and providing a detector signal;
adjusting the detector signal with a programmable gain element to provide a measured value of leak rate;
setting the transmission of the mass filter and a gain of the programmable gain element to first calibration values, which correspond to a first working range, such that the measured value of the leak rate is within a predetermined dynamic range; and
setting the transmission of the mass filter and the gain of the programmable gain element to second calibration values, which correspond to a second working range, such that the measured value of the leak rate is within the same predetermined dynamic range.

12. The method as defined in claim 11, wherein the mass filter comprises a turbomolecular pump and wherein setting the transmission of the mass filter to first and second calibration values comprises setting the turbomolecular pump to first and second pump speeds, respectively.

13. The method as defined in claim 12, wherein setting the gain of the programmable gain element to first and second calibration values comprises setting the gain of an analog-to-digital converter having a programmable gain.

14. The method as defined in claim 11, further comprising; correcting the calibration for ambient temperature of the calibrated leak.

15. The method as defined in claim 11, further comprising; correcting the calibration for offset resulting from electronic noise.

16. The method as defined in claim 11, further comprising; correcting the calibration for background tracer gas.

17. The method as defined in claim 11, further comprising; tuning the detector for maximum detector signal.

18. The method as defined in claim 11, further comprising; performing calibration of the leak detector automatically in response to a mode control signal.

* * * * *

UNITED STATES PATENT AND TRADEMARK OFFICE
CERTIFICATE OF CORRECTION

| | |
|---|---|
| PATENT NO. | : 8,555,704 B2 |
| APPLICATION NO. | : 12/254279 |
| DATED | : October 15, 2013 |
| INVENTOR(S) | : Kevin Flynn et al. |

It is certified that error appears in the above-identified patent and that said Letters Patent is hereby corrected as shown below:

In the Claims

In column 9, line 26, in claim 9, delete "correspondg" and insert -- corresponding --, therefor.

In column 10, line 37, in claim 17, delete "comprising;" and insert -- comprising: --, therefor.

In column 10, line 39, in claim 18, delete "comprising;" and insert -- comprising: --, therefor.

Signed and Sealed this
Fourth Day of February, 2014

Michelle K. Lee
*Deputy Director of the United States Patent and Trademark Office*